(12) United States Patent
Madison (10) Patent No.: US 10,540,157 B2
(45) Date of Patent: Jan. 21, 2020

(54) SYSTEMS TO REMOVE OBJECT RELATIONAL MAPPINGS FROM A SOFTWARE PROJECT

(71) Applicant: Level 3 Communications, LLC, Broomfield, CO (US)

(72) Inventor: John C. Madison, Broomfield, CO (US)

(73) Assignee: Level Communications, LLC, Broomfield, CO (US)

( * ) Notice: Subject to any disclaimer, the term of this patent is extended or adjusted under 35 U.S.C. 154(b) by 0 days.

(21) Appl. No.: 16/033,456

(22) Filed: Jul. 12, 2018

(65) Prior Publication Data
US 2019/0026090 A1    Jan. 24, 2019

Related U.S. Application Data

(60) Provisional application No. 62/533,906, filed on Jul. 18, 2017.

(51) Int. Cl.
*G06F 9/44* (2018.01)
*G06F 8/51* (2018.01)
*G06F 8/75* (2018.01)
*G06F 16/25* (2019.01)

(52) U.S. Cl.
CPC ............... *G06F 8/51* (2013.01); *G06F 8/75* (2013.01); *G06F 16/252* (2019.01)

(58) Field of Classification Search
CPC ....................................................... G06F 8/51
USPC ....................................................... 717/137
See application file for complete search history.

(56) References Cited

U.S. PATENT DOCUMENTS 6,163,776 A * 12/2000 Periwal ................. G06F 16/289
2009/0144696 A1 * 6/2009 Andersen ............... G06F 16/289
717/109

* cited by examiner

*Primary Examiner* — Evral E Bodden (57) ABSTRACT

Systems and methods for automatically replacing an ORM code in an object-oriented source code with static and parameterized SQL statements. A source codebase, written in an object-oriented programming language is analyzed to find any ORM interactions. The ORM interactions are executed to obtain SQL statements, which are integrated into a new source code to replace the ORM interactions.

19 Claims, 5 Drawing Sheets

SYSTEMS TO REMOVE OBJECT RELATIONAL MAPPINGS FROM A SOFTWARE PROJECT

CROSS-REFERENCE TO RELATED APPLICATIONS

This application is related to and claims priority under 35 U.S.C. § 119(e) from U.S. Patent Application No. 62/533,906, filed Jul. 18, 2017 entitled "SYSTEMS TO REMOVE OBJECT RELATIONAL MAPPINGS FROM A SOFTWARE PROJECT," the entire contents of which is incorporated herein by reference for all purposes.

TECHNICAL FIELD

Aspects of the present disclosure relate to object-oriented programming, and in particular, to object-relational mapping techniques used in software project development.

BACKGROUND

Object-Relational Mapping ("ORM") is a programming technique that allows developers to write source code using object-oriented programming languages instead of Structured Query Language ("SQL") to access data maintained in a relational database. Developers can use their preferred object-oriented programming language to work with a database instead of hard-coding SQL statements or other types of stored procedures. For example, and without imputing limitation, an ORM code written in the Java® programming language may be used to retrieve from a database information related to a particular entry with an identification number of "0001" and with the ORM code written as:
    DBValue thisEntry=database.GetEntryID("0001");
In contrast, a hard-coded SQL statement achieving the same outcome may be considerably more verbose and be constructed with a different semantic model. The hard-coded SQL query may also be more difficult to use with variable lookups (for example, where an input to the source code is used to generate a database query such as in a web platform receiving user queries or where a dictionary of entries is updated frequently and recompiling source code for every update would be impractical). The SQL query may be written and transmitted to the database using the JDBC Java® API to connect to the target database as below:
    String sql="SELECT . . . FROM entries WHERE id=0001";
    Connection conn=null;
    Statement stmt=conn.createStatementQ;
    DBValue thisEntry=stmt.executeQuery(sql);
Often, ORM is used during rapid development of software written using an object-oriented programming language. Using ORM can speed up development by not having to switch between writing in the object-oriented programming language and writing declarative SQL statements when attempting to access a database—doing so is often time consuming and labor intensive. Moreover, using ORM allows developers to switch between different databases with minimal modifications being made to the object-oriented source code.

As a software project becomes more complex and the speed of development becomes less important, the continued use of ORM may present challenges. For example, overuse of ORM in a software project may reduce performance of the resultant program since the ORM translates application code into a corresponding SQL statement. Moreover, once a software project is released into a production environment, rarely is a database changed. So the continued use of ORM to abstract away database dependencies provides minimal value. Thus, while an ORM tool is a useful tool for rapidly bringing a software project into production, its continued use in real production environments offers diminishing returns. However, manual removal of ORM is often a tedious and error-prone process that slows down bringing a software project into production and/or introduces new bugs due to inconsistent ORM removal or human error.

It is with these problems in mind, among others, that various aspects of the present disclosure were conceived.

BRIEF DESCRIPTION OF THE FIGURES

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure involve systems and methods for automatically removing object-relational mapping techniques from a software project and/or production environment (e.g., an environment where computing systems, software, and other products are put into operation for their intended uses by end users). Generally speaking, object-relational mapping (referred to as ORM, O/RM, and/or O/R mapping tool) integrates object programming language capabilities with relational databases. More specifically, ORM is used in object-oriented programming to provide an abstraction layer over a relational database (which uses some version of SQL) so that any miss-match between the database and an object-oriented programming language is overcome and any changes to the underlying database technology will have minimal impact upon the object-oriented software under development. Stated differently, ORM hides and encapsulates changes in a relational database so that when the database and/or its application programming interfaces ("APIs") change, only the ORM layer needs to altered to propagate the change throughout the source code; the source code written by the developer may remain unaltered.

ORMs are useful tools when rapidly developing a software project and ultimately bringing the software into production. However, once a software project is deployed, continued use of ORM present challenges, as described above. The disclosed systems automatically remove ORM mechanisms (e.g., code, libraries, and dependencies) from a software project and/or production environment. To enable the removal of ORM from a software project, the disclosed system performs a static code analysis wherein object-oriented code is examined to identify ORM code. Once identified, the ORM code is executed, or parsed, to capture SQL statements that correspond to the execution of the ORM code. The SQL statements may be intercepted after being generated by the ORM code and before being received by the target database, or they may be parsed and have conversion rules applied to them. The captured SQL statements are then integrated into the source code as static, parameterized, SQL statements to thereby generate a new version of the source code that is independent of ORM. The new version of the source code may exhibit a relatively substantial speed increase in code execution because instructions associated with the ORM code are no longer executed in database interactions.

Figure 1:
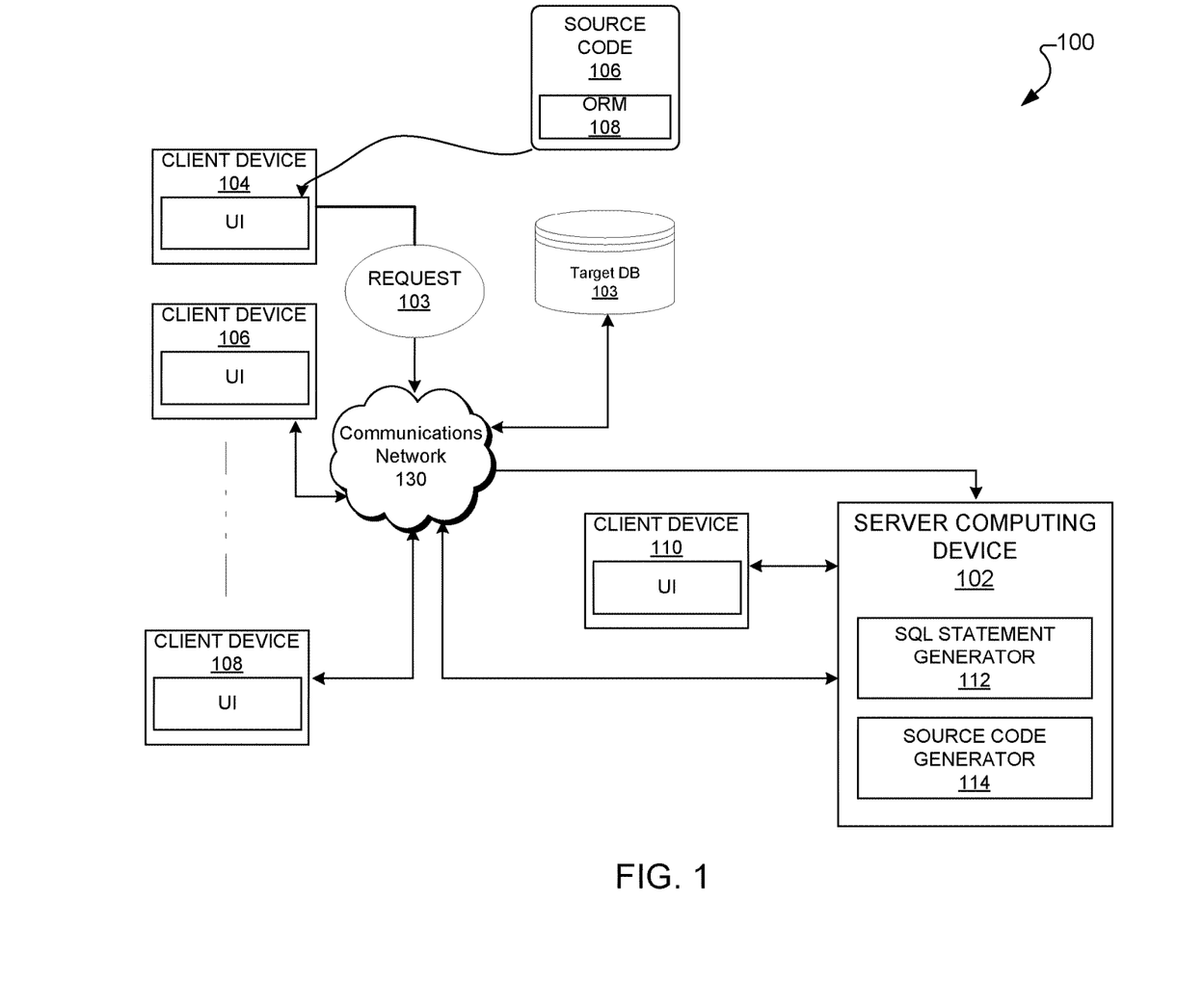
FIG. 1 is a block diagram illustrating a computing network for automatically removing ORM code from a software project and/or production environment, according to aspects of the present disclosure.

FIG. 1 illustrates an example computing network 100 for automatically removing ORM mechanisms or ORM code from a software project and/or production environment, according to one embodiment. The computing network 100 may be an IP-based telecommunications network, the Internet, an intranet, a local area network, a wireless local network, a content distribution network, or any other type of communications network, as well as combinations of networks. For example, in one particular embodiment, the network 100 may be a telecommunications network including fiber-optic paths between various network elements, such as servers, switches, routers, and/or other optical telecommunications network devices that interconnect to enable receiving and transmitting of information between the various elements as well as users of the network. In some embodiments, computing network 100 may be a self-contained computing system with devices communicating between each other internally.

The computing network 100 includes a server computing device 102, which may be a processing device that functionally connects (e.g., using communications network 100) to one or more client devices 104-110 included within the computing network 100. A user interested in removing ORM from a software project may interact with one or more client device(s) 104-110 to initiate a request, which may be received by the server computing device 102. More particularly, the one or more client device(s) 104-110 may also include a user interface ("UI"), such as a browser application (i.e., a graphical-user interface) or a command-line interface (i.e., a text interface), to generate a request 103 for removing ORM from a source code of a software project. In response, the server computing device 102 may transmit instructions that may be processed and/or executed to generate, or otherwise display, a UI for receiving a source code of a software project and/or production environment. The one or more client devices 104-110 may be any of, or any combination of, a personal computer; handheld computer; mobile phone; digital assistant; smart phone; server; application; and the like. In one embodiment, each of the one or more client devices 104-110 may include a processor-based platform that operates on any suitable operating system, such as Microsoft® Windows®, Linux®, and/or the like that is capable of executing software.

In one specific example, a user may provide as input (e.g., via the UI of the one or more client devices 104-110) or otherwise access a source codebase 106. The source codebase 106 includes various program methods and/or functions that interact with or otherwise include an ORM code library 108 to access data maintained in a target database 103. In one specific example, the source codebase 106 may be or otherwise include a collection of computer instructions written in an object-oriented computer programming language, such as Java®, C, C++, and/or the like. The target database 103 may be a database that uses SQL to manage data maintained in the target database 103. Stated differently, to access data of the target database 103, a SQL query may be called within the source code 106 that automatically fetches and returns data (e.g., a results table) from a database table maintained within the target database 103. The returned data may then be used for other operations by the source code, such as, and without limitation, providing excerpts to a requesting user, informing an algorithm, or storing partial or complete data elsewhere (e.g., for providing a backup of critical data).

Although the source codebase 106 is illustrated as being provided as input by a user, it is contemplated that the source codebase 106 may be automatically obtained by the server computing device 102 directly from a software project and/or production environment that is maintained local to the server computing device 102 or remote to the server computing device 102. For example, and without imputing limitation, the server computing device 102 may retrieve the source codebase 106 from a code repository, or "repo," by being provided an IP address and access credentials to access the repo and retrieve a copy of a latest version of the source codebase 106.

In some embodiments, the repo may automatically perform ORM removal as described herein based on either a scheduled frequency or project milestones (e.g., such as a "1.0 build" and the like). The repo may automatically provide the source codebase 106 to the server computing device 102 for removing the ORM. For example, once the project associated with the source codebase 106 has progressed to a certain point, the ORM can be automatically removed without direct user interaction.

The various methods and/or functions of the source codebase 106 may use the ORM code library 108 to access the target database 103. In particular, the ORM 108 provides the ability to map the data representation of the object model of the source codebase 106 to the relational data model and its corresponding database schema of the target database 103. For example, in a C++ computing environment, the ORM 108 abstracts C++ classes to database tables and from C++ data types to SQL data types used in the target database 103.

The server computing device 102 may process the source codebase 106 to identify all of the methods and/or functions that interact with the ORM 108 and simulate interaction of such methods and/or functions with the target database 103 through the use of dummy values, sandboxed and/or virtual environments, and/or interception of messages transmitted to the target database 103. Based on the simulated interactions, the server computing device 102 may initiate a SQL statement generator 112 to generate or otherwise output a series of SQL statements that correspond to the ORM 108. A source code generator 114 may insert the output series of SQL statements into a newly generated source code, in place of the removed ORM 108 from the source code 106.

Figure 2:
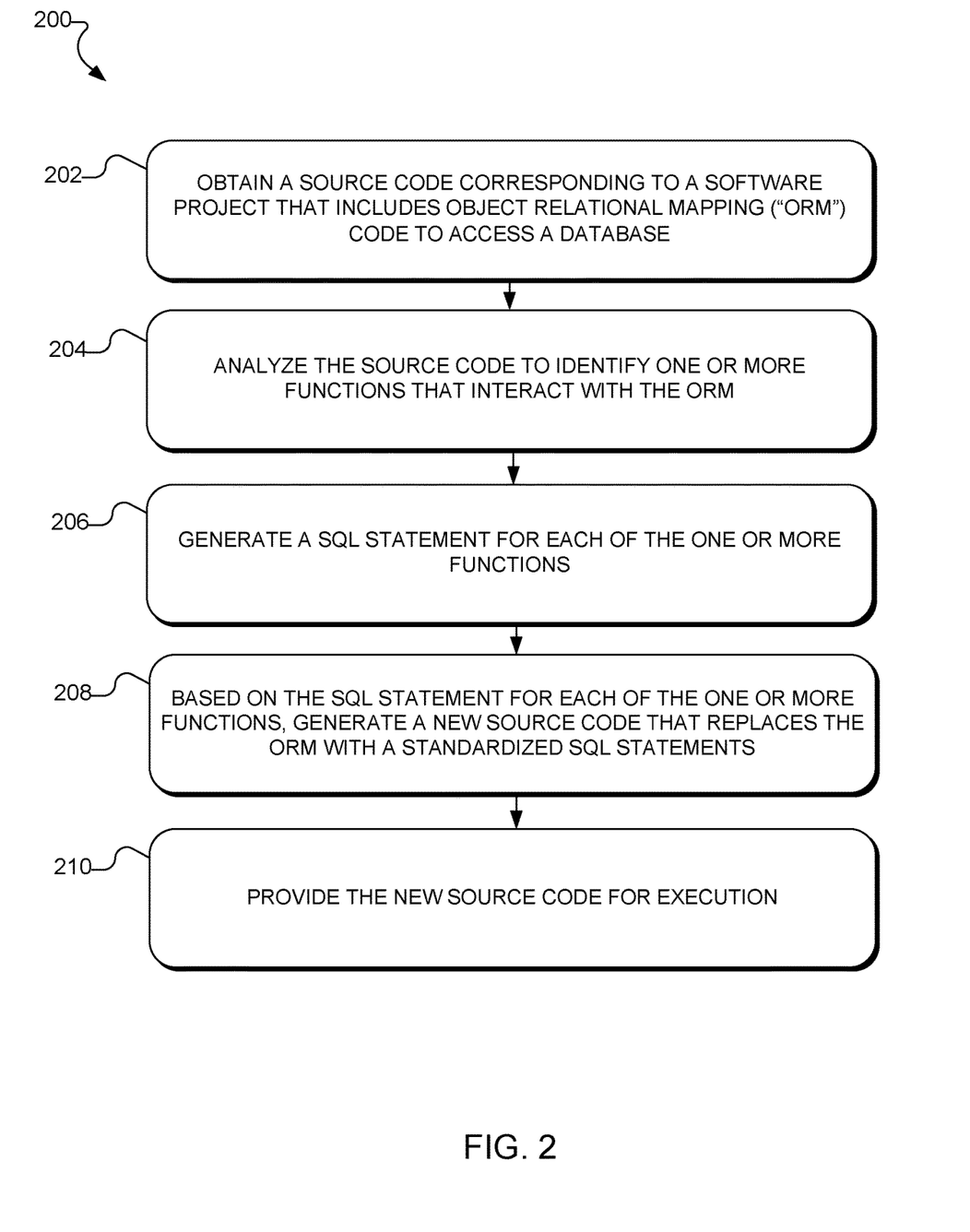
FIG. 2 is a flowchart illustrating an example process and/or method for automatically removing ORM code from a software project and/or production environment, according to aspects of the present disclosure.

Referring now to FIG. 2 and with reference to FIG. 1, an illustrative process 200 for automatically removing ORM from a software project and/or production environment is provided. As illustrated, process 200 begins with obtaining a source codebase corresponding to a software project that uses, at least partially, ORM to access a database (operation 202). Referring to FIG. 1, the server computer device 102 may receive or otherwise access the source code 106 that includes ORM 108 to access the target database 103. For example, assume a software project is being implemented to enable web-based teleconferencing. In order to enable such functionality, the software may include source code related to Open Connect, which is an open source software application for connecting to virtual private networks (VPN) that implement secure point-to-point connections. To implement the web-based teleconferencing software, the Open Connect software is integrated or otherwise used in conjunction with various other web services and/or applications that enable the provisioning of web-based teleconferences and related software services. Additionally, the software accesses to a database that contains subscriber information for all of the subscribers that have or will participate in a web-based teleconference. Thus, the web-based teleconferencing software project uses multiple and different applications that communicate with Open Connect as well as a database that contains subscriber information for all of the subscribers that have or will participate in a web-based teleconference. In some instances, the source code uses ORM to enable the Open Connect software to access the subscriber database. The server computing device 102 may thus obtain the source code corresponding to such a project and begin removing the ORM from the source code.

Referring again to FIG. 2, the obtained source code is analyzed to identify one or more procedures, functions, routines, methods, subprograms, and/or library calls of the source code that interact with ORM (operation 204). Referring to FIG. 1, the source code 103 may be analyzed, line-by-line, to identify whether a function and/or method of the source code 103 interacts with the ORM module 104. In particular, the source code 103 may be analyzed to identify any procedure, function, routine, method, subprogram, and/or library call, included in the source code that is associated with an ORM call, or ORM library call, to access data of the target database 103. Referring to the web-based teleconference software example above, the obtained source code may be analyzed to identify every procedure, function, routine, method, subprogram, and/or library that involves ORM (e.g., an ORM call) attempting to access the subscriber database.

Referring again to FIG. 2, for each identified procedure, function, routine, method; subprogram, and/or library call, one or more SQL statements may be generated (operation 206). In particular, the SQL statement generator 112 may generate any SQL statement by executing each identified procedure, function, routine, method, subprogram; and/or library call associated with the ORM. Code execution may be achieved by executing the source code, and "stepping through" the code during execution such as with a debugger or similar utility. When the source code is executed, execution of a compiled instruction can be associated with a line of source code from which it was compiled, and then flagged so that the line may be identified. The code may also undergo partial compilation, wherein only a select subset of the code is targeted for compilation and all dependencies within the code itself (e.g., variable declarations, object instantiations, etc.) for the targeted subset of the code is compiled along with the targeted subset itself in order to ensure successful execution. In either case, arbitrary test values, or dummy values, may be used in lieu of actual data in order to successfully generate SQL statements.

When the ORM code is executed, an output is generated that includes a SQL statement native to the ORM programming technique. The SQL statement generator 112 translates the SQL statement from an ORM-based SQL statement to a SQL statement written in standard SQL that is compatible with the target database 103. In one example, the standard SQL statement generated from the ORM-based SQL statement may be static. That is to say, the standard SQL statement may be immutable and fixed and thus always produce the same query whenever it is executed and regardless of the execution environment. In another example, the standard SQL statement generated from the ORM-based SQL statement may be parameterized and reflect variables saved prior to generating the statement and from which the statement may be generated. In other words, a parameterized SQL statement may be constructed so as to take input from a user or service before producing a database query.

Figure 3:
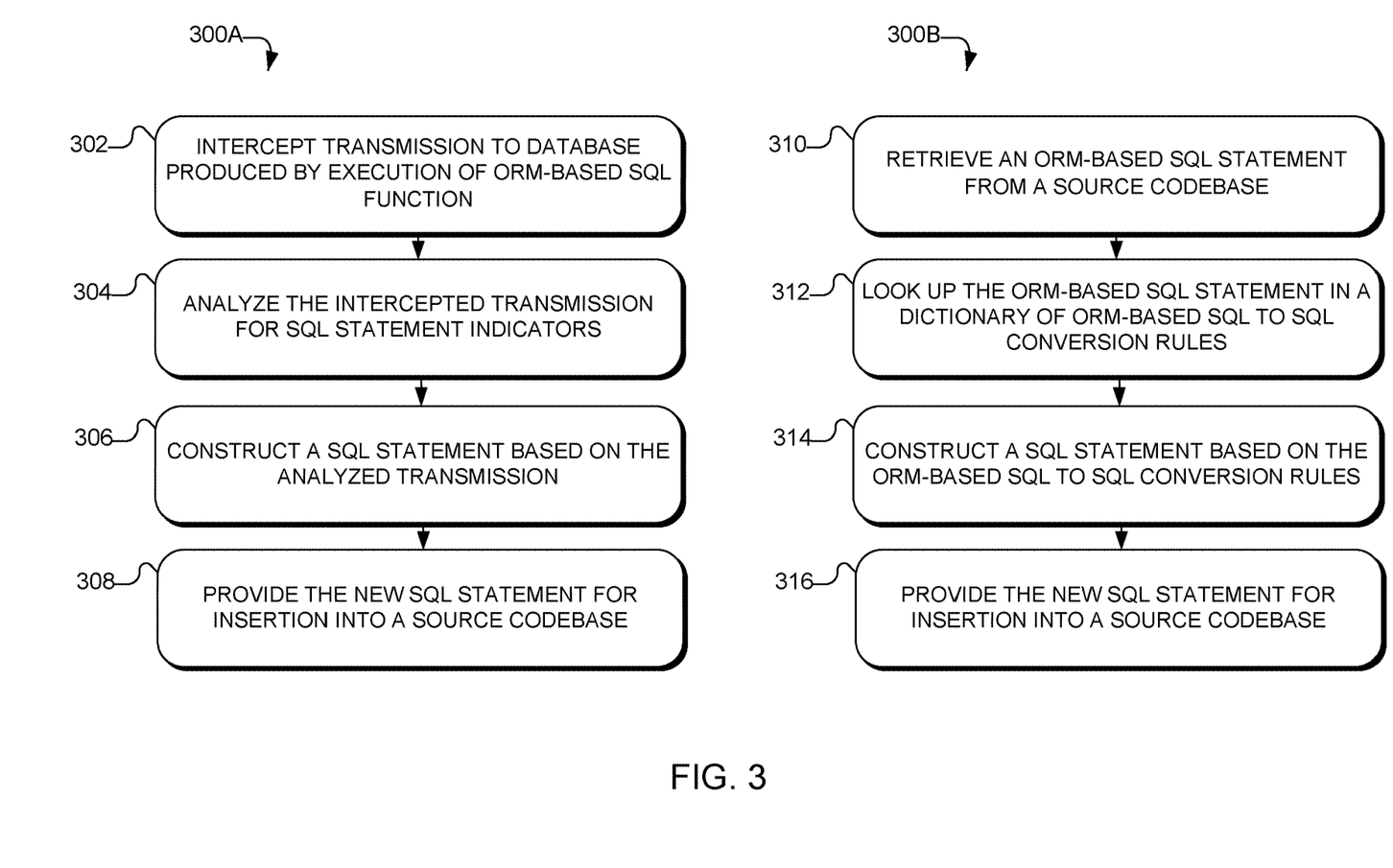
FIG. 3 is a set of flowcharts illustrating example processes and/or methods for generating SQL statements, according to aspects of the present disclosure.
Figure 4:
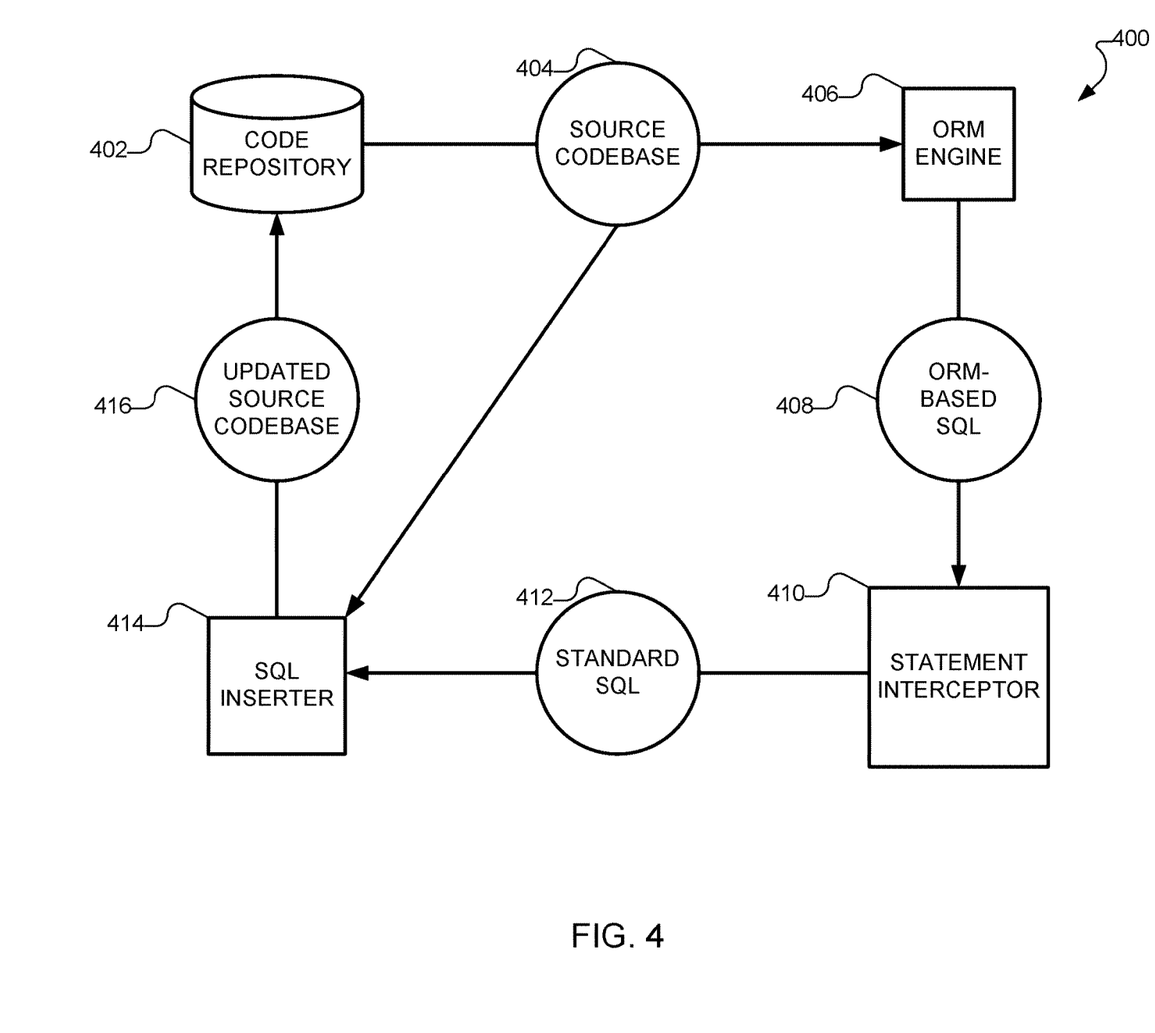
FIG. 4 is a diagram illustrating a system for automatically removing ORM code from a software project, according to aspects of the present disclosure.

FIG. 3 depicts two subroutines 300A and 300B for generating a standard SQL statement from the ORM-based SQL statement. FIG. 4 depicts a system 400 for performing subroutine 300A. A source codebase 404 may be retrieved from a code repository 402 by an ORM engine 406 by transmitting a request from the ORM engine 406 to the code repository 402 and receiving back by the ORM engine 406 a data file including the source codebase 404. In other embodiments, the source codebase 404 may be multiple files comprising various libraries and dependencies. In some embodiments, the source codebase 404 may be a single file or minimally operable portion of the complete codebase.

In any case, the ORM engine 406 may execute portions or all of the source codebase 404 in order to generate ORM-based SQL 408. The ORM-based SQL 408 can then be intercepted enroute to the database 103 by a statement interceptor 410 (operation 302). Because the ORM code is an abstraction layer over the database 103, the ORM-based SQL 408 can be processed for standard SQL contents contained within it. In other words, the commands ultimately received by the database 103 are typically of the correct format, whether hardcoded or generated by an ORM library. Therefore, the intercepted commands can be used to yield standard SQL 412 even when the source codebase 404 uses an ORM library to generate the SQL.

The ORM-based SQL 408 can be intercepted by reading all data passed along a particular channel. The channel may be either a virtual channel or a real channel. The intercepting module may be located at either the origin point of the transmission or the receiving point of the transmission. For example, and without imputing limitation, the ORM code may be executed in a virtual environment in which all externally facing transmissions (such as to an external database) are intercepted at an "edge" of the virtual environment. In another example, the ORM-based SQL 408 may be intercepted as it is received by the database 103 by an interim service. The ORM-based SQL 408 may also be retrieved at the point of origin by a messenger service which can be designed to relay messages to various other services such as a database, as in the case of micro-services architectures.

Once the transmission has been intercepted, it may be analyzed for indicia of particular SQL statements (operation 304). In some embodiments, these indicia may be literal SQL statements. In some embodiments, particular sequences of bits may be mapped to particular SQL statements and these sequences may be contained within a network or instruction packet. For example, a programmable parser may be chosen based on the databases being used and run over network (either internal or external) traffic to identify packets intended for the database and originating from the ORM engine 406. Once the respective packets have been identified, the programmable parser can parse the packet contents to interpret the ORM-based SQL statement 408 from the bits of the packet by matching bit sequences with predefined mappings (e.g., a deterministic finite automata, or DFA, may identify a packet header from a specific sequence of bits, which may thus cause the DFA to interpret the next sequence of bits as mapped to content of the packet according to a particular protocol until a particular end sequence is detected). In other embodiments, a fixed parser may be used and can retrieve the ORM-based SQL statement 408 of various packets intended for different databases. The fixed parser may be positioned by a dispatcher within the larger network and thus may be able to intercept packets from various services and ORM engines 406 and intended to be received by multiple and varied databases or other services such as in a micro-services architecture.

A standard SQL statement 412 can then be constructed based on the analysis of the intercepted transmission (operation 306). Where multiple indicia are detected, the respective SQL statements can be joined together as a single, complex SQL statement. For example, where the indicia are related to a variable storing the results of an operation on query results of two sequential statements (such as storing a list of all new customers who have made payments to their accounts by marking overlap between a list of new customers and a list of customers have made payments to their accounts), an "INNER JOIN" SQL statement can be created and its query results stored directly into the variable rather than performing operations outside of the query. Alternatively, multiple, sequentially executed SQL statements can be generated by the multiple indicia. For example, a programmable parser may parse the contents of an intercepted packet as discussed above. The programmable parser may convert the bits contained within the packet (e.g., following the packet header) into one or more SQL strings, distinguishing SQL strings by a '\n' or "newline" character, and identifying the end of the packet by a null character. Where multiple SQL strings are produced from the packet, a join operation may be utilized to merge the multiple queries into a single one.

Finally, the constructed SQL statement or statements may be inserted into the associated codebase by a SQL inserter 414 (operation 308). The SQL inserter 414 may receive a copy of the source codebase 404 directly from the code repository 402. In some embodiments, the SQL inserter 414 can receive the source codebase 404 at the same time it is provided to the ORM engine 406. In some embodiments, the SQL inserter 414 may receive a copy of the source codebase 404 once standard SQL 412 has been generated for insertion. In such a case, the standard SQL 412 can be provided along with metadata or other indexing information so the SQL inserter 414 can adequately identify the correct code repository 402 and software project from which to retrieve a source codebase 404. In some embodiments, the standard SQL 412 may be tagged or otherwise associated with a specific line or lines of the source code in order to inform the system where to replace ORM code with the generated standard SQL 412.

The inserted statements may replace the associated ORM code in order to remove the ORM code from the codebase. The insertion may be accomplished by overwriting a local copy of the codebase before ultimately providing an updated source codebase 416 to the repository 402 as a new version of the codebase. Other validation and debug operations may also be run prior to providing the new version of the codebase to the repository. As can be seen in FIG. 4, this sequence can be performed as a loop or circuit and therefor providing for multiple runs through the system 400 until no ORM-based SQL 408 can be identified and executed.

Returning to FIG. 3, the subroutine 300B depicts an alternative method to subroutine 300A for generating SQL statements and does not necessitate transmission interception. First, a line or block of ORM code is identified and an ORM-based SQL statement retrieved or generated from the identified ORM code (operation 310). ORM code need not be fully executed in subroutine 300B. In some embodiments, the ORM code may be executed to validate or complete the retrieval of the ORM-based SQL statement.

The ORM-based SQL statement may then be looked up in a translation dictionary containing information instructing conversion rules for various ORM-based SQL statements (operation 312). In some embodiments, multiple conversion rules may be retrieved and the multiple conversion rules may be combined, in sequence or otherwise, to generate a conversion algorithm for an ORM-based SQL statement. For example, and without imputing limitation, an ORM code including a method "getValues(columnName, 10)" may be found in the dictionary under a key "getValues."

Once conversion rules have been identified, a standard SQL statement may be generated based on applying the rules to the ORM-based SQL statement (operation 314). Continuing the above example, the "getValues" key can be used to access a sequence of functions for constructing a SQL statement structured as a string and appropriately concatenating the value of the "columnName" variable into the string as well as "10" (seen here as a raw integer value; however, the integer may also be appropriately converted into a string format and concatenated into the constructed SQL statement accordingly). The sequence of functions may further include appropriate construction of a database command for passing the string containing the SQL statement and concatenated values to a respective database engine.

Finally, similarly to subroutine 300A, the generated SQL statement can then be inserted into the codebase (operation 316). Insertion functionality of subroutine 300B may operate largely similar to that of subroutine 300A. As above, a local copy of the codebase may be edited to replace the respective ORM code with a SQL statement constructed by the operations above. The local copy can then be provided to a repository as a new version of the codebase.

Referring again to FIG. 2, a new source code may be generated that replaces the ORM calls with standardized SQL statements based on the generated SQL statements or the functions (operation 208). Referring to FIG. 1, the source code generator 114 generates a new source code based on the original source code 106 provided to the server computing device 102. In one specific example, the new source code may be equivalent to the original source code with the SQL statements included in the source code where a corresponding ORM call was originally made. Stated differently, the SQL statement may replace the ORM calls included in the original source code 106 with the standardized SQL statements. In another example, optionally, the source code generator 114 may include in the new source code or generate another source code that can transform database result sets received from the target database 103 into object-oriented programming objects and, inversely, automatically insert or update the objects data in the target database 103 by converting changes to object-oriented programming objects into standard SQL statements. Referring again to FIG. 2, the new source code is provided to be executed (operation 210).

For example, the server computing device may deploy the new source code within an active production environment for execution by users.

Figure 5:
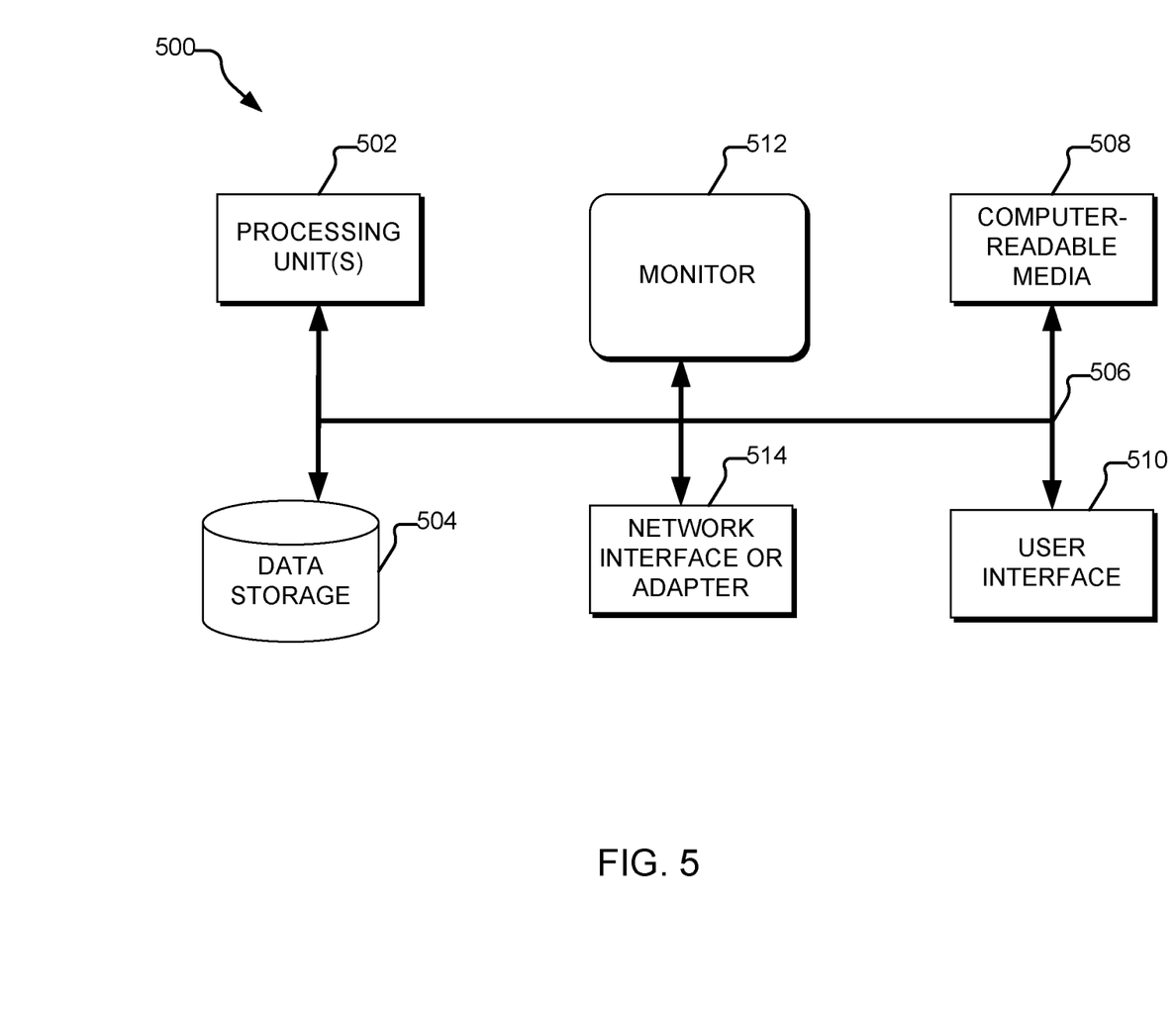
FIG. 5 is an example computing device specifically configured and implemented for automatically removing ORM code from a software project and/or production environment, according to aspects of the present disclosure.

FIG. 5 illustrates an example of a suitable computing and networking environment 500 that may be used to implement various aspects of the present disclosure described in FIG. 1-2. As illustrated, the computing and networking environment 500 includes a general purpose computing device 500, although it is contemplated that the networking environment 500 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 500 may include various hardware components, such as a processing unit 502, a data storage 504 (e.g., a system memory), and a system bus 506 that couples various system components of the computer 500 to the processing unit 502. The system bus 506 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 may further include a variety of computer-readable media 508 that includes removable/non-removable media and volatile/nonvolatile media, but excludes transitory propagated signals. Computer-readable media 508 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 500. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 504 includes computer storage media in the form of volatile/nonvolatile memory such as read only memory (ROM) and random access memory (RAM). A basic input/output system (BIOS), containing the basic routines that help to transfer information between elements within the computer 500 (e.g., during start-up) is typically stored in ROM. RAM typically contains data and/or program modules that are immediately accessible to and/or presently being operated on by processing unit 502. For example, in one embodiment, data storage 504 holds an operating system, application programs, and other program modules and program data.

Data storage 504 may also include other removable/non-removable, volatile/nonvolatile computer storage media. For example, data storage 504 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 510 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 502 through a user interface 510 that is coupled to the system bus 506, but may be connected by other interface and bus structures, such as a parallel port, game port or a universal serial bus (USB). A monitor 512 or other type of display device is also connected to the system bus 506 via an interface, such as a video interface. The monitor 512 may also be integrated with a touch-screen panel or the like.

The computer 500 may operate in a networked or cloud-computing environment using logical connections of a network interface or adapter 514 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public and/or private network through the network interface or adapter 514. In such embodiments, a modem or other means for establishing communications over the network is connected to the system bus 506 via the network interface or adapter 514 or other appropriate mechanism. A wireless networking component including an interface and antenna may be coupled through a suitable device such as an access point or peer computer to a network. In a networked environment, program modules depicted relative to the computer 500, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for removing a programming abstraction layer from a code, the method comprising:
    receiving, from a repository, a first source code comprising an abstraction code over a relational database;
    identifying, by a processor, a portion of the abstraction code interacting with an object-relational mapping (ORM) code;
    executing, utilizing the processor, the portion of the abstraction code to generate an abstracted instruction for accessing the relational database;
    intercepting, by the processor, the abstracted instruction during transmission of the abstracted instruction from the executed portion of the abstraction code to the relational database;
    generating, by the processor, a second source code using the intercepted abstracted instruction, wherein the second source code is independent of the portion of the abstraction code, and wherein the second source code is used for accessing the relational database without interacting with the ORM code; and
    removing, by the processor, the identified portion of the abstraction code interacting with the ORM code.

2. The method of claim 1, wherein the abstracted instruction comprises a Structured Query Language (SQL) statement.

3. The method of claim 1, wherein the portion of the abstraction code includes all of the abstraction code over the relational database within the first source code.

4. The method of claim 1, further comprising:
    accessing, by the processor, a translation dictionary comprising stored portions of abstraction code as keys, each of the keys associated with a respective value comprising a respective abstracted instruction; and
    retrieving, by the processor, the abstracted instruction from the translation dictionary by using a particular key comprising the portion of abstraction code.

5. The method of claim 4, wherein the respective value further comprises a respective instruction for integrating the respective abstracted instruction into a particular source code as a replacement for the key.

6. The method of claim 1, further comprising transmitting, by the processor, the second source code to the repository.

7. The method of claim 6, wherein the repository comprises a versioning system associating the first source code and the second source code with a shared codebase and wherein the second source code is further associated with a later version of the shared codebase than the first source code.

8. A system for removing a programming abstraction layer from a code, the system comprising:
    a processor; and
    a memory storing instructions, the instructions comprising:
        receiving, from a repository, a first source code comprising an abstraction code over a relational database;
        identifying a portion of the abstraction code interacting with an object-relational mapping (ORM) code;
        executing the portion of the abstraction code to generate an abstracted instruction for accessing the relational database;
        intercepting the abstracted instruction during transmission of the abstracted instruction from the executed portion of the abstraction code to the relational database;
        generating a second source code using the intercepted abstracted instruction, wherein the second source code is independent of the portion of the abstraction code, and wherein the second source code is used for accessing-the relational database without interacting with the ORM code;
        transmitting the second source code to the repository: and
        removing the identified portion of the abstraction code interacting with the ORM code.

9. The system of claim 8, wherein the abstracted instruction comprises a SQL statement.

10. The system of claim 8, wherein the portion of the abstraction code includes all of the abstraction code within the first source code.

11. The system of claim 8, wherein the memory stores a translation dictionary comprising stored portions of abstraction code as keys, each of the keys associated with a respective value comprising a respective abstracted instruction, and wherein the instructions further comprise:
    accessing the translation dictionary; and
    retrieving the abstracted instruction from the dictionary by using a particular key comprising a portion of the portion of abstraction code.

12. The system of claim 11, wherein the respective value further comprises a respective instruction for integrating the respective abstracted instruction into a particular source code as a replacement for the key.

13. The system of claim 8, wherein the repository comprises a versioning system associating the first source code and the second source code with a shared codebase and wherein the second source code is further associated with a version of the shared codebase later than the first source code.

14. A non-transitory computer-readable medium storing a computer program that, when executed on a computer system configured to receive and transmit source code, causes the computer system to perform instructions for removing a programming abstraction layer over a relational database, the instructions comprising:
    receiving a first source code from a repository, the first source code comprising an abstraction code over a relational database;
    identifying a portion of the abstraction code interacting with an object-relational mapping (ORM) code;
    executing the portion of the abstraction code to generate an abstracted instruction for accessing the relational database, the abstracted instruction comprising a SQL statement;
    intercepting the abstracted instruction during transmission of the abstracted instruction from the executed portion of the abstraction code to the relational database;
    generating a second source code using the intercepted abstracted instruction, wherein the second source code is independent of the portion of the abstraction code, and wherein the second source code is used for accessing-the relational database without interacting with the ORM code;

transmitting the second source code to the repository; and
removing the identified portion of the abstraction code interacting with the ORM code.

15. The non-transitory computer-readable medium of claim 14, wherein the portion of the abstraction code includes all of the abstraction code within the first source code.

16. The non-transitory computer-readable medium of claim 14, wherein the instructions further comprise:
accessing a translation dictionary comprising stored portions of the abstraction code as keys, each of the keys associated with a respective value comprising a respective abstracted instruction; and
retrieving an abstracted instruction from the translation dictionary by using a particular key comprising the portion of abstraction code.

17. The non-transitory computer-readable medium of claim 16, wherein the respective value further comprises a respective instruction for integrating the respective abstracted instruction into a particular source code as a replacement for the key.

18. The non-transitory computer-readable medium of claim 14, wherein the code repository comprises a versioning system associating the first source code and the second source code with a shared codebase and wherein the second source code is further associated with a later version or the shared codebase than the first source code.

19. The non-transitory computer-readable medium of claim 14, wherein the repository is accessed over a network.

* * * * *